J. D. HEEBNER.
Manure Drag.

No. 106,158.

Patented Aug. 9, 1870.

WITNESSES:
Chas. A. Pettit
D. Durand

INVENTOR:
Josiah D. Heebner
by Munn & Co
his Attorneys

United States Patent Office.

JOSIAH D. HEEBNER, OF NORRITTONVILLE, PENNSYLVANIA, ASSIGNOR TO HIMSELF AND DAVID S. HEEBNER, OF SAME PLACE.

Letters Patent No. 106,158, dated August 9, 1870.

IMPROVEMENT IN MANURE-DRAG.

The Schedule referred to in these Letters Patent and making part of the same.

To all whom it may concern:

Be it known that I, JOSIAH D. HEEBNER, of Norrittonville, in the county of Montgomery and State of Pennsylvania, have invented a new and improved Manure-Drag; and I do hereby declare that the following is a full, clear, and exact description of the same, reference being had to the accompanying drawing making a part of this specification, in which—

Figure 1:
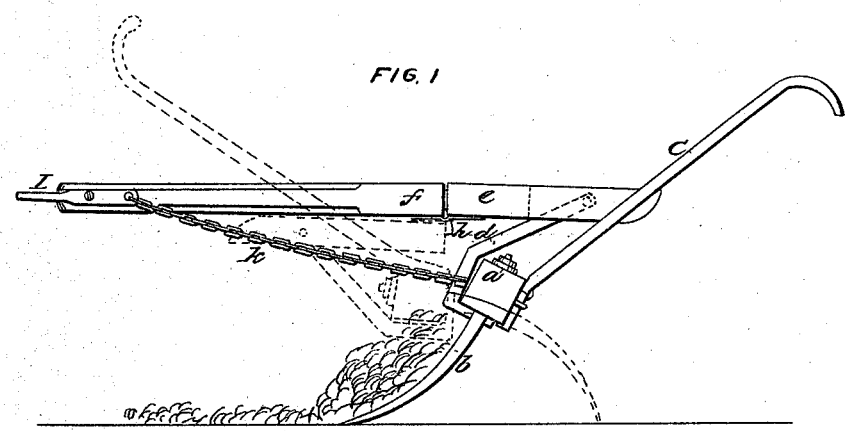
Figure 2:
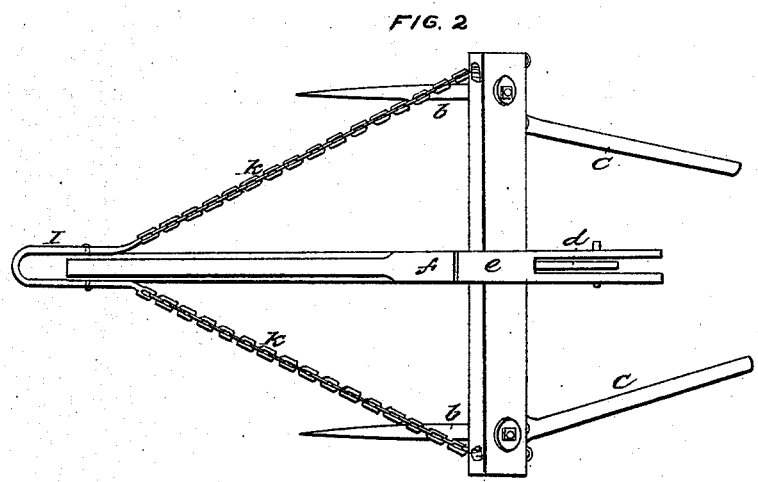

Figure 1 is a side elevation of the invention; and
Figure 2 is a plan of the same.

This invention has for its object to effect the removal of manure from barns occupied by cattle, and lacking floors, such as are common in the Middle and Western States.

The invention consists of a bar, provided with a sufficiency of metal teeth, projecting downward from one side, of proper dimensions for the purpose, and furnished with handles like those of a plow, and with a standard projecting upward, in combination with a beam, jointed at its rear end to the top of said standard, and provided at its front extremity with a clevis, to which to attach draft animals, and made in two sections, which are hinged together, the object of this last arrangement being to enable the operator to dump the drag by pressing with his foot on the rear end of the beam, and thus throwing the joint upward.

In the drawing—
$a$ is the bar;
$b$, the teeth;
$c$, the handles;
$d$, the standard;
$e f$, the two parts of the beam;
$h$, the hinge, by which these parts are connected;
$i$, the clevis on the end of the beam; and
$k k$, the chains, stretched between the extremities of the bar $a$ and the front end of the beam $f$.

When the two sections of the beam are extended in a straight line the chains are stretched taut. The chains being thus stretched and the drag loaded, when the operator wishes to discharge the load he presses with his foot on the rear extremity of the section $e$ of the beam.

This pressure throws up the two adjacent ends of the sections $e f$ that are hinged together, and the bar $a$ advances, while the teeth are detained by the load until the bar $a$ draws the teeth out of the load, and they rest in a horizontal position upon the same.

On extending the two sections $e f$ into line again the drag is once more ready to take up a fresh load.

Instead of a jointed beam, I may make use of a rigid beam, and cut a slot in the standard $d$, and connect the beam and stand by a pin passing through the slot. This arrangement would answer the same purpose.

Having thus described my invention,

What I claim as new, and desire to secure by Letters Patent, is—

The combination of the drag $a b$ with the standard $d$, and jointed beam $e f$, in the manner and for the purpose specified.

JOSIAH D. HEEBNER.

Witnesses:
SOLON C. KEMON,
CHAS. A. PETTIT.